3,039,528
INTERMEDIATES IN THE PREPARATION OF
ALDOSTERONE ANTAGONISTS
Glen E. Arth, Cranford, and Lewis H. Sarett, Princeton,
N.J., assignors to Merck & Co., Inc., Rahway, N.J., a
corporation of New Jersey
No Drawing. Filed Jan. 7, 1959, Ser. No. 785,319
4 Claims. (Cl. 260—397.4)

This invention relates to steroids and more particularly to compounds which are useful as intermediates in the preparation of aldosterone antagonists.

Aldosterone is a powerful agent for maintaining electrolite balance in adrenalectomized patients and in patients suffering from adrenal hypofunction. Aldosterone promotes water retention and retention of sodium and chloride ions and tends to promote excretion of potassium. Oversecretion of aldosterone can therefore be seen to cause electrolite imbalance. It is necessary in those cases to administer an aldosterone antagonist in order to restore the balance.

The compounds of the present invention are intermediates which are useful as starting materials for the preparation of aldosterone antagonists. The intermediates of this invention have the general formula

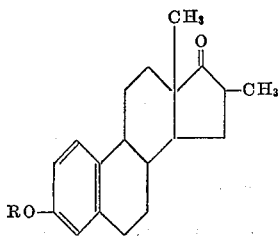

where R is a lower alkyl radical.

Compounds of the present invention may be synthesized from estrone. Estrone is alkylated according to conventional procedures, as for example by reaction with dimethyl sulfate in the presence of aqueous alkali at elevated temperature according to the method of Butenandt et al., Z. Physiol. Chem., 208, 167 (1932). Other lower dialkyl ethers of estrone can be produced by substitution of the appropriate dialkyl sulfate such as diethyl sulfate or dimethyl sulfate. The estrone lower alkyl ether such as estrone 3-methyl ether is reacted with sodium and ethyl formate in an inert solvent and in an inert atmosphere to form a 16-formyl-1,3,5(10)-estratrien-3-ol-17-one 3-lower alkyl ether, according to the procedure of Bardhan, J. Chem. Soc. (1936), 1948 (at page 1851).

The conversion of 16-formyl-1,3,5(10)-estratrien-3-ol-17-one 3-lower alkyl ethers to the products of the present invention may be illustrated as follows:

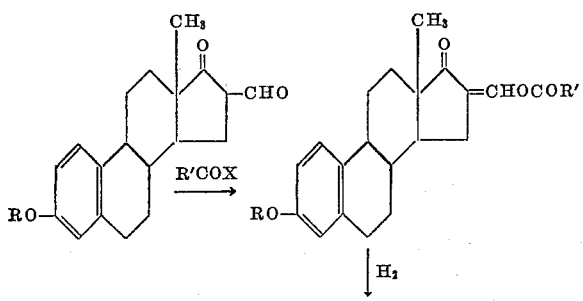

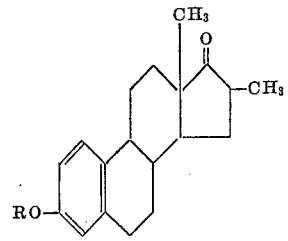

In the above equation R is a lower alkyl radical, R' is a hydrocarbon radical selected from the group consisting of alkyl, aryl, and aralkyl radicals containing from one to eight carbon atoms, such as methyl, ethyl, butyl, phenyl, benzyl, and phenylethyl, and X is a halogen such as chlorine or bromine.

By way of specific illustration of the process of the present invention, 16-formyl-3-methoxy-1,3,5(10)-estratrien-17-one is reacted with acetyl chloride in pyridine at low temperature (not over 10° C. and preferably about 0° to 5° C.), thereby forming 16-acetoxymethylene-3-methoxy-1,3,5(10)-estratrien-17-one. This compound is hydrogenated to form a reaction product mixture consisting of the desired compound 3-methoxy-16β-methyl-1,3,5(10)-estratrien-17-one, as well as the by-product 16-acetoxymethyl - 3 - methoxy - 1,3,5(10) - estratrien-17-one. The hydrogenation may be carried out by passing hydrogen into a solution of the starting steroid in a lower aliphatic alcohol such as ethanol in the presence of a hydrogenation catalyst such as palladium on charcoal. This reaction is preferably conducted at elevated pressure, on the order of about 40 lbs. per square inch. The desired product may be separated from the by-product by removing all solvent from the reaction product mixture and redissolving the residue in petroleum ether, in which the desired 16β-methyl-1,3,5-estratrien-3-ol-17-one 3-methyl ether is preferentially soluble. Chromatography of the petroleum ether solution on acid-washed alumina, followed by elution with a 9:1 mixture of petroleum ether and ether yields substantially pure 3-methoxy-16β-methyl-1,3,5(10)-estratrien-17-one.

Various modifications can be made within the skill of the art. For example, other acyl chlorides such as propionyl chloride, butyryl chloride, benzoyl chloride, acetyl bromide, and the like may be substituted for acetyl chloride.

Products of the present invention can be converted to aldosterone antagonists. For example, 3-methoxy-16β-methyl-1,3,5(10)-estratrien-17-one can be reacted sequentially with acetylene magnesium bromine and water, thereby forming 3-methoxy-16β-methyl-17α-ethynyl-1,3,5(10)-estratrien-17β-ol, which is reacted with ethyl magnesium bromide, followed by carbon dioxide to form 3-[3-methoxy-16β-methyl - 17β - hydroxy-1,3,5(10)-estratrien-17α-yl]-2-propynoic acid. Reaction of this compound with lithium and ammonia yields 3-[3-methoxy-16β-methyl-17β-hydroxy-2,5(10)-estradien - 17α-yl] propionic acid, which on acidification with an aqueous mineral acid yields the aldosterone antagonist, 3-(oxo-16β-methyl - 17β - hydroxy-4-estrene-17α-yl) propionic acid gamma-lactone. This procedure is more fully described and claimed in the co-pending application of Glen E. Arth, Phyllis Tormo, and Lewis H. Sarett, Serial No. 785,321, filed of even date herewith, entitled "Aldosterone Antagonists." This aldosterone antagonist can also be prepared according to the foregoing procedure starting with other compounds of the present invention, viz., the 3-(lower alkoxy)-16β-methyl-1,3,5(10)-estratrien-3-ol-17- ones where the lower alkoxy group is ethoxy, propoxy, butoxy, and the like.

The preparation of the starting material 16-formyl-3-methoxy-1,3,5(10)-estratrien-17-one from estrone may be carried out according to the following procedure:

Twenty grams of estrone and 100 g. of potassium hydroxide in one liter of water are heated to boiling with vigorous mechanical stirring. A clear solution results. This solution is cooled to 10° to 15° C., resulting in the formation of a precipitate. This solution is maintained at 10° to 15° C. while 100 ml. of dimethyl sulfate is slowly added with stirring. Stirring is continued for three hours, and the temperature is held at about 10° C. The solution is heated to boiling for 15 minutes and filtered while hot. The residue is washed three times with water, dried in air, and the dried product dissolved in benzene. The benzene solution is clarified with a small amount of charcoal ("Darco G–60") and filtered through diatomaceous earth ("Supercel"). Crystalline estrone 3-methyl ether, M.P. 168°–172° C., is obtained on evaporation of the solvent.

A solution of 36.48 g. of estrone 3-methyl ether in 800 ml. of benzene in a two-necked flask is heated to drive off water. To the resulting solution having a volume of about 700 ml. is added 50 ml. of distilled ethyl formate. A condenser is immediately attached to one neck of the flask, and 8 g. of sodium in pea-sized pieces is added through the other neck while the solution is stirred magnetically in a nitrogen atmosphere. Stirring is continued for about sixteen hours. At this time an equal volume of benzene is added to the slurry in the flask, and the slurry and benzene are carefully decanted from the unreacted sodium into a cold aqueous sodium phosphate buffered solution (pH ca. 4) in a carbon dioxide atmosphere. The mixture is stirred mechanically and transferred to a separatory funnel where the mixture is vigorously shaken and the aqueous layer separated. The benzene layer is washed three times with water and dried. The aqueous layer is extracted three times with ethyl acetate. The ethyl acetate layers are combined, washed three times with water and added to the benzene layer. The combined ethyl acetate and benzene solutions are dried and evaporated to about 150 ml. at which point crystallization begins. The solution is placed in a refrigerator overnight, the supernatant liquid decanted, and the crystals washed once with methanol by decantation and then filtered, washed with ether, and dried. The product 16-formyl-3-methoxy-1,3,5(10)-estratrien-17-one has a melting point of 167° to 174° C. This compound is a starting material for the preparation of compounds of the present invention.

The preparation of compounds of the present invention will now be illustrated with respect to the following specific examples:

EXAMPLE 1

*16-Acetoxymethylene-3-Methoxy-1,3,5(10)-Estratrien-17-One*

To a solution of 28.79 g. of 16-formyl-3-methoxy-1,3,5(10)-estratrien-17-one in 450 ml. of pyridine was added 18 ml. of acetyl chloride over a 30-minute period with stirring while the temperature was maintained between 2° and 5° C. Stirring was continued at about 3° C. for an additional 15 minutes and then at room temperature for one and one-half hours. Twenty milliliters of water is added slowly and an additional 430 ml. of water added with stirring and cooling. The precipitate which formed was filtered, squeezed with a spatula to expel as much water as possible, transferred to a beaker, broken up with a spatula, suspended in water which was added to the beaker, transferred back to the filter, and washed with water until pyridine odor was gone. The residue on the filter was pumped to dryness and recrystallized from acetone, yielding pure 16-acetoxymethylene-3-methoxy-1,3,5(10)-estratrien-17-one. Yield 27.5 g., M.P., 171°–173° C.

EXAMPLE 2

*3-Methoxy-16β-Methyl-1,3,5(10)-Estratrien-17-One*

A solution of 23 g. of 16-acetoxymethylene-3-methoxy-1,3,5(10)-estratrien-17-one in 1,125 ml. of ethanol was reacted with approximately the theoretical quantity of hydrogen at 40 p.s.i.g. in the presence of 45 g. of a 10% palladium on charcoal catalyst. The hydrogen was passed into the solution until reaction stopped. The reaction mixture was filtered through diatomaceous earth ("Supercel"), and the filtrate evaporated to dryness. The residue was extracted with petroleum ether. Part of the residue remained undissolved. The petroleum ether soluble portion, which weighed 9.09 g., was diluted with additional petroleum ether and charged on a column of about 270 g. of acid-washed alumina. Upon elution with mixtures of petroleum ether and ether there was obtained in the 90% petroleum ether-10% ether fraction the compound 3-methoxy-16β-methyl-1,3,5(10)-estratrien-17-one which was recrystallized from ethanol. Yield 6.65 g., M.P. 97°–98° C. The petroleum ether insoluble residue was essentially the by-product 16-acetoxymethyl-3-methoxy-1,3,5(10)-estratrien-17-one; M.P. 149°–151° C.

What is claimed is:

1. A compound having the general formula

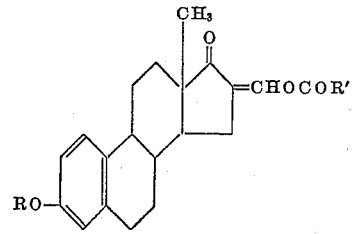

where R is a lower alkyl radical and R' is selected from the group consisting of lower alkyl radicals and aryl and aralkyl radicals containing from six to eight carbon atoms.

2. 16 - acetoxymethylene - 3 - methoxy-1,3,5(10)-estratrien-17-one.

3. A process for preparing compounds having the general formula

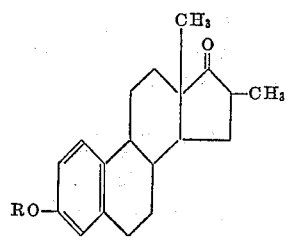

where R is a lower alkyl radical, which comprises reacting a compound having the general formula

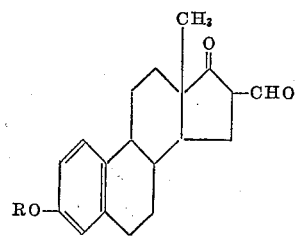

with an acyl halide of the general formula R'COX, where R' is selected from the group consisting of lower alkyl radicals and aryl and aralkyl radicals containing from six to eight carbon atoms, and X is a halogen, thereby forming a compound having the general formula

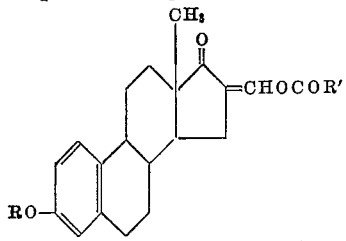

and hydrogenating said compound to form a reaction product containing a compound of the general formula

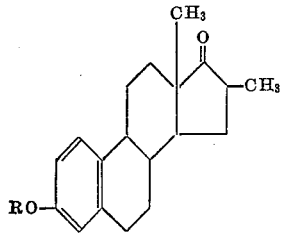

4. A process for preparing a compound having the general formula

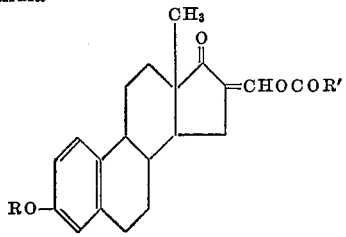

where R is a lower alkyl radical and R' is selected from the group consisting of lower alkyl radicals and aryl and aralkyl radicals containing from six to eight carbon atoms, which comprises reacting a compound having the general formula

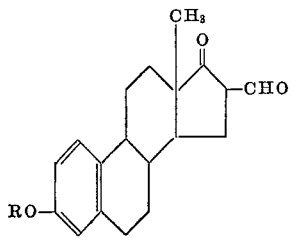

with an acyl halide of the general formula R'COX where X is a halogen.

References Cited in the file of this patent
UNITED STATES PATENTS

| | | |
|---|---|---|
| 2,663,716 | Johnson et al. | Dec. 22, 1953 |
| 2,855,411 | Mueller | Oct. 7, 1958 |
| 2,918,463 | Cella | Dec. 22, 1959 |

OTHER REFERENCES

Marker et al.: 64 J.A.C.S. 1280 (1942).
Taub et al.: 80 J.A.C.S. 4435 (1958).